(12) United States Patent
Ye et al.

(10) Patent No.: US 10,542,020 B2
(45) Date of Patent: Jan. 21, 2020

(54) HOME NETWORK INTRUSION DETECTION AND PREVENTION SYSTEM AND METHOD

(71) Applicant: Tyco Fire & Security GmbH, Neuhausen am Rheinfall (CH)

(72) Inventors: Cheng Yuan Yap Ye, Irvine, CA (US); Richard Campero, Gilroy, CA (US); Paul Rasband, Lantana, FL (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 131 days.

(21) Appl. No.: 15/082,940

(22) Filed: Mar. 28, 2016

(65) Prior Publication Data

US 2016/0285904 A1    Sep. 29, 2016

Related U.S. Application Data

(60) Provisional application No. 62/138,927, filed on Mar. 26, 2015.

(51) Int. Cl.
| | |
|---|---|
| G06F 21/55 | (2013.01) |
| H04L 29/06 | (2006.01) |
| G06F 12/14 | (2006.01) |

(52) U.S. Cl.
CPC .............................. *H04L 63/1425* (2013.01)

(58) Field of Classification Search
None
See application file for complete search history.

(56) References Cited

U.S. PATENT DOCUMENTS

| | | | |
|---|---|---|---|
| 8,914,406 B1* | 12/2014 | Haugsnes | H04L 67/1097 382/305 |
| 2009/0300353 A1* | 12/2009 | Hart | H04L 63/1441 713/168 |
| 2010/0102951 A1* | 4/2010 | Rutledge | G08B 25/009 340/507 |
| 2015/0287295 A1* | 10/2015 | Trivelpiece | H04W 4/029 340/6.1 |

OTHER PUBLICATIONS

A Parallel Architecture for Stateful Intrusion Detection in High Traffic Networks. Colajanni et al. (Year: 2006).*
Rule-Based Anomaly Detection on IP Flows. Duffield et al. IEEE (Year: 2009).*

(Continued)

*Primary Examiner* — Venkat Perungavoor
(74) *Attorney, Agent, or Firm* — Foley & Lardner LLP

(57) ABSTRACT

A home network Intrusion and Detect on Protection System (IDPS) is described. The Home Network IPDS provides a managed client solution that secures client home networks including both wired and wireless networks. The home networks can include not only computer devices and mobile devices, but also can include other connected devices such as smart devices. In embodiments, a software agent hosted on devices within the client's home network detects and scans for threats and provides remediation for the threats including blacklisting and placing compromised devices in a quarantined state. Logs created in response to threats are compared against known threats, and device reputation databases in a service network are maintained for the devices in each managed client network.

19 Claims, 13 Drawing Sheets

(56) References Cited

OTHER PUBLICATIONS

A Parallel Architecture for Stateful Intrusion Detection in High Traffic Networks to Colajanni et al. (Year: 2006).*
Rules-Based Anomaly Detection on IP Flows. Duffield et al. IEEE. (Year: 2009).*
KR 20090058318. English Translation. Joeung. (Year: 2009).*
KR 200900009416. English Translation. Joeung. (Year: 2009).*
Product-Based Security Model for Smart Home Appliances. Pishva et al. IEEE. (Year: 2008).*
Securing Smart Home: Technologies, Security Challenges, Security Requirements. Lee et al. IEEE. (Year: 2014).*
Specifications-based Intrusion Detection for Home Area Networks in Smart Grids. Jokar et al. IEEE SmartGridComm. (Year: 2011).*
Security Service Framework for Home Network. Jiang et al. IEEE. (Year: 2005).*

* cited by examiner

HOME NETWORK INTRUSION DETECTION AND PREVENTION SYSTEM AND METHOD

RELATED APPLICATIONS

This application claims the benefit under 35 USC 119(e) of U.S. Provisional Application No. 62/138,927, filed on Mar. 26, 2015, which is incorporated herein by reference in its entirety.

BACKGROUND OF THE INVENTION

Home networks are increasingly being deployed in residences and home offices. Home networks have traditionally included an Internet access point or modem that provides a gateway between the Internet, usually via a service provider such as Comcast or Verizon, and the home network. The home networks have traditionally included one or more computer devices. The connection between the computer devices and the access point has traditionally been a wired connection, using local area network (LAN) technology such as the standard IEEE 802.3, or wireless protocols, such as Bluetooth and WiFi (IEEE 802.11). Examples of these computer devices include desktop computers, workstations, laptops, and mobile phones having a local interface, in examples.

Modern wired protocols such as Universal Powerline Bus (UPB) and wireless protocols such as Z-Wave and Zigbee have enabled the expansion of home networks to include new types of devices. Compared to traditional wired and wireless protocols, these newer protocols typically have a shorter range and require fewer hardware and software resources from the devices. The new devices are typically referred to as smart devices or Internet of Things (IoT) devices.

Smart devices can range widely in size and function. Examples include computer tablets, smart pens, and home automation systems for controlling thermostats and lighting and appliances and associated sensors. Other examples include smart watches and fitness monitors, and security-related devices such as video cameras, door locks, motion sensors, and window and door sensors that detect entry/exit. Finally, hybrid smart devices also known as protocol bridges support multiple protocols and enable communications between smart devices and computer devices that support different protocols.

Smart devices have limited capabilities as compared to computer devices. Computer devices typically provide support for multiple software applications, local storage of user files, and user access to operating system resources. In contrast, smart devices typically have a small footprint operational firmware image that includes the operating system and all interfaces. The firmware provides limited user and network access to its resources. Typically, changes or updates to any features provided by a smart device require replacement of its entire firmware image.

A wireless router connected to the modem/internet access point typically provides a wireless network within the home network. The wireless network is often connected to a hub that provides a common connection point for smart devices within the home network.

All networks are susceptible to cyber attacks. Cyber attacks attempt to breach the security boundaries of networks to gain unauthorized access to computing resources of the devices or personal data located on the devices, and to disrupt or impair functioning of the devices and/or their applications. Cyber threats include phishing attacks, modified traffic packets that attempt to access secure ports within the operating system and/or firmware of devices, email attachments that include malware such as trojan horses, rootkits, and worms, and denial of service attacks, to list a few examples.

SUMMARY OF THE INVENTION

To combat the threat of cyber attacks, large government and business enterprise networks typically deploy sophisticated Intrusion Detection and Prevention Systems (IDPS). These systems include state-of-the-art firewall data security devices to detect and block threats before they can enter the networks. The computer devices on these networks also typically include antivirus software applications installed on the computer devices. Antivirus applications are a per-device security solution that secures the individual devices it is installed on. The antivirus applications scan the individual devices for threats and can take actions to remediate the threats.

In contrast, current IDPS systems for home networks lack the sophistication of IDPS systems of larger networks and protect only the wired networks in the home networks. Unlike the firewall devices of larger networks, the firewall capability of home networks is usually included within the internet access point and typically utilizes outdated firewall technology. This increases the likelihood that cyber attacks penetrate the home network. Moreover, unlike a wired network, threats directed at the wireless network do not need to breach the wireless network through a gateway such as the internet access point. Wireless cyber threats can be launched directly at the wireless devices themselves such as the wireless routers, home automation hubs, and smart devices.

Once a cyber threat does penetrate the home network, its contents and effects often propagate quickly from one device to another and among the wired and wireless networks within the home network. This is especially true for smart devices, because they typically cannot support antivirus applications to remediate and/or stop a cyber threat before it can continue to other devices.

The present invention can provide an IDPS cyber threat solution that secures both wired and wireless networks within a home network. The solution can protect not only computer devices and mobile devices, but can also protect other connected devices such as smart devices.

Embodiments of the invention include a software agent that detects threats, blocks threats if possible, conducts penetration testing, scans for security vulnerabilities, logs detected threats, samples traffic or anomalies, delivers logged data to a managed service application over a network cloud for advanced analysis, and receives periodic updates and on-demand instructions to resolve issues detected.

In general, according to one aspect, the invention features a network intrusion detection and prevention system. The system comprises a services network having a management and notification system that executes client services and home intrusion and detection devices for client homes, each of these devices communicating via wired and wireless ports for home wired networks and wireless networks and reporting to a corresponding one of the client services.

In embodiments, the services network further comprises an analytics system, an IP address and device reputation database, and a threat database. The management and notification system can include separate managed client services for each home intrusion and detection device. The home intrusion and detection devices can enable radios for each supported wireless networks and listen for data traffic on the wireless networks and analyze the data traffic against rules supplied by the services network.

In examples, the home intrusion and detection devices scan their firmware for malware and/or other anomalies and can scan devices on the networks for security configuration settings that could be unsafe.

In general, according to another aspect, the invention features a network intrusion detection and prevention method. This method comprises providing a services network having a management and notification system that executes client services and home intrusion and detection devices for client homes communicating via wired and wireless ports to home wired networks and wireless networks and reporting to a corresponding one of the client services.

In general, the IDPS cyber threat method and system that can secure both wired and wireless networks within a home network including smart devices. The method and system includes a software agent that detects threats, block threats if possible, conducts penetration testing, scans for security vulnerabilities, logs detected threats, samples traffic or anomalies, delivers logged data to a managed service application over a network cloud for advanced analysis, and/or receives periodic updates and on-demand instructions to resolve issues detected.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
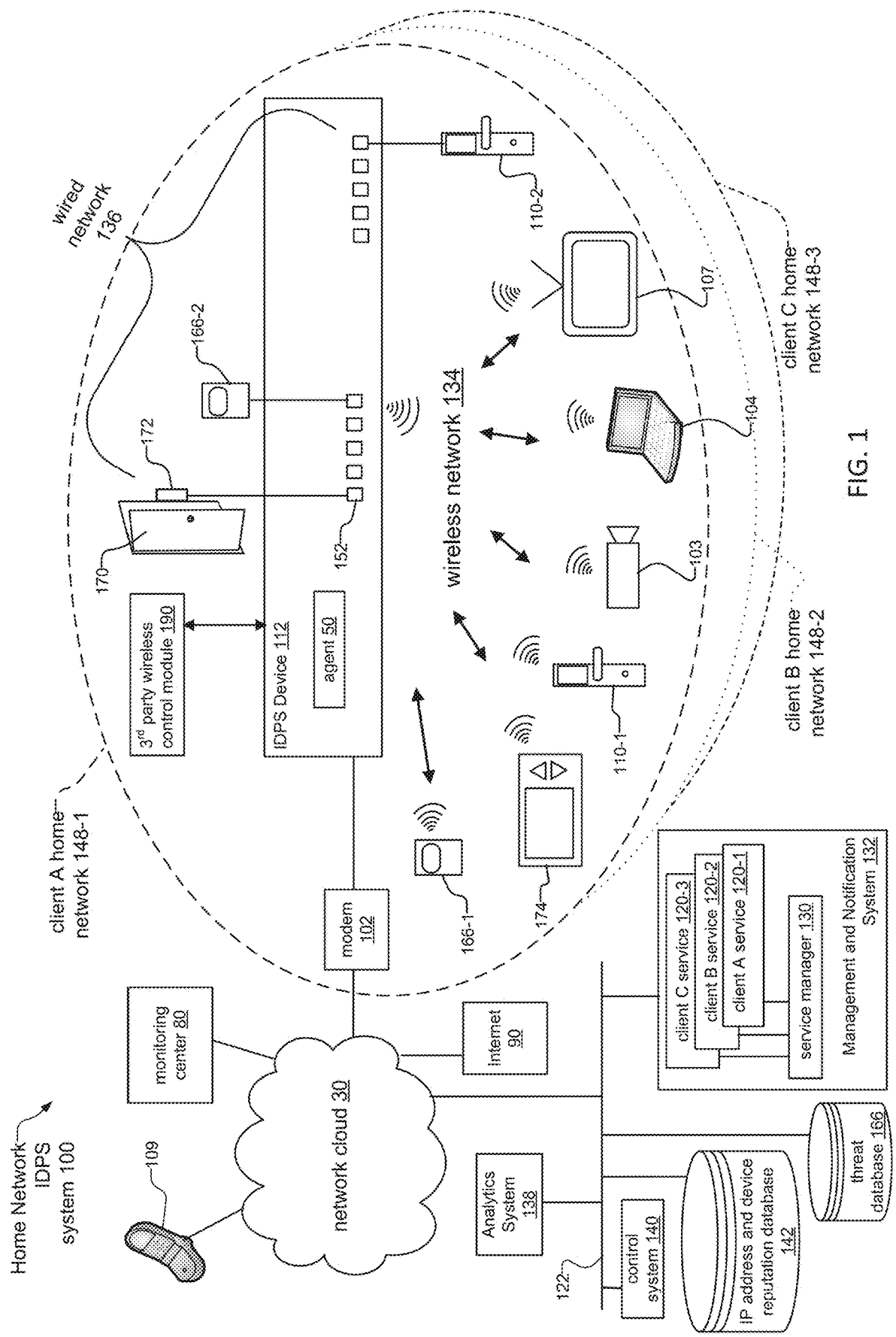
FIG. 1 is a schematic block diagram of a preferred embodiment of a Home Network Intrusion Detection and Prevention System (IDPS) that provides managed cyber threat protection services for multiple client home networks, where the home networks include an IDPS device hosting an agent, where the agent provides the intrusion detection and protection capability, and where the IDPS device also provides the functions of a router and/or hub.

FIG. 1 shows a preferred embodiment of the Home Network IDPS system 100. The system 100 includes a services network 122 that provides managed cyber threat protection services for one or more client home networks 148-1 through 148-3. The services network 122 is owned and managed by an entity that is different than the home network clients 148. An exemplary home network for client "A" is shown, indicated by reference 148-1. The home networks 148 communicate with the service network 122 over a network cloud 30.

The home network 148-1 connects to the Internet 90 over the network cloud 30, which typically includes service provider networks. An internet access point such as a modem 102 provides the connection between the home network 148 and the network cloud 30, Each home network 148 typically includes one or more wired networks 136 and one or more wireless networks 134.

The home network 148-1 includes an IDPS device 112 that functions both as a router and/or hub. The IDPS device 112 includes a software agent 50 that provides cyber threat intrusion detection and protection capabilities. The IDPS device 112 hosts the agent 50.

The IDPS device 112 includes ports to which both wireless and wired devices connect. Data traffic received from a device associated with one port 152 is copied to all other ports 152. The wired network 134 includes a door sensor 172 for a door 170, a motion sensor 166-2, and a wired door lock 110-2.

The wireless network 134 includes a wireless motion sensor 166-1, a wireless thermostat 174, a wireless door lock 110-1, a wireless video camera 103, a wireless laptop 104 and a smart TV 107. The IDPS device 112 can also communicate with one or more third-party wireless control modules 190, These include proprietary home automation controllers from manufacturers such as Lutron and Insteon, in examples.

The services network 122 includes a management and notification system 132, a control system 140, an analytics system 138, an IP address and device reputation database 142, and a threat database 166. The management and notification system 132 includes separate managed service applications ("services") 120 for each client home network 148 and includes a service manager 130. The service manager 130 manages the services 120. The services 20 are preferably implemented as Software as a Service (SaaS) applications. For example, the client A service 120-1 manages client A's home network 148-1, the client B service 120-2 manages client B's home network 148-2, and the client C service 120-3 manages client C's home network 148-3.

The services 120 notify users of the client home networks 148 via messages sent to the users' mobile phone 109 over the network cloud 30. In examples, the messages include email and SMS text messages. The services 120 can also send notifications associated with cyber threats on client home networks 148 to a remote monitoring center 80 over the network cloud 30. In another example, the monitoring center 80 can also be included within the service network 122.

Figure 2:
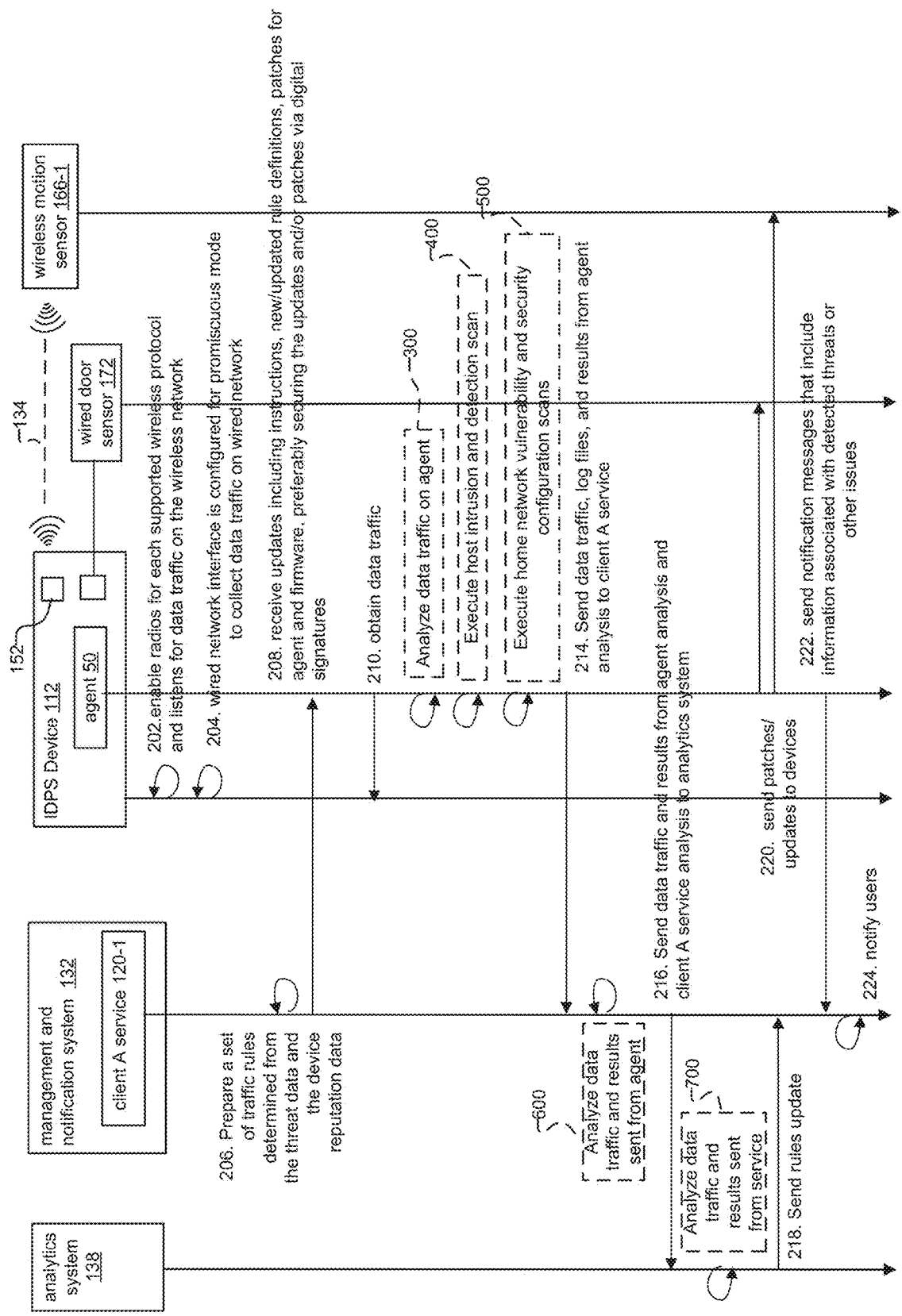
FIG. 2 is a flow diagram showing data flows between the major components of the embodiment of in FIG. 1, where the data flows are associated with various intrusion detection and prevention actions executed by the agent in conjunction with a managed services application for exemplary client A's home network.

FIG. 2 shows data flows between high-level components in the embodiment of FIG. 1. The components include the analytics system 138, the management notification system 132 and its client A service 120, the IDPS device 112 and its agent 50, Exemplary devices include a wired door sensor 172 and wireless motion sensor 166-1.

In step 202, the device 112 enables radios for each supported wireless protocol and listens for data traffic on the wireless network 134. In step 204, the wired network interface is configured for promiscuous mode to collect data traffic on the wired network 136.

According to step 206, the client A service 120-1 prepares a set of traffic rules determined from the threat data and the device reputation data from the threat database 166 and IP address and device reputation database 142, respectively. In step 208, the agent 50 receives updates from the client A service 206 that include instructions, new/updated rule definitions, and patches for agent firmware, in examples. The agent 50 preferably secures the updates and/or patches via digital signatures.

In step 210, the agent 50 obtains traffic data from the IDPS device 112. The data traffic can include both received data packets and data packets that the IDPS device 112 is preparing to transmit to the devices on its ports 152. In step 300, the agent 50 analyzes the data traffic.

Figure 9:
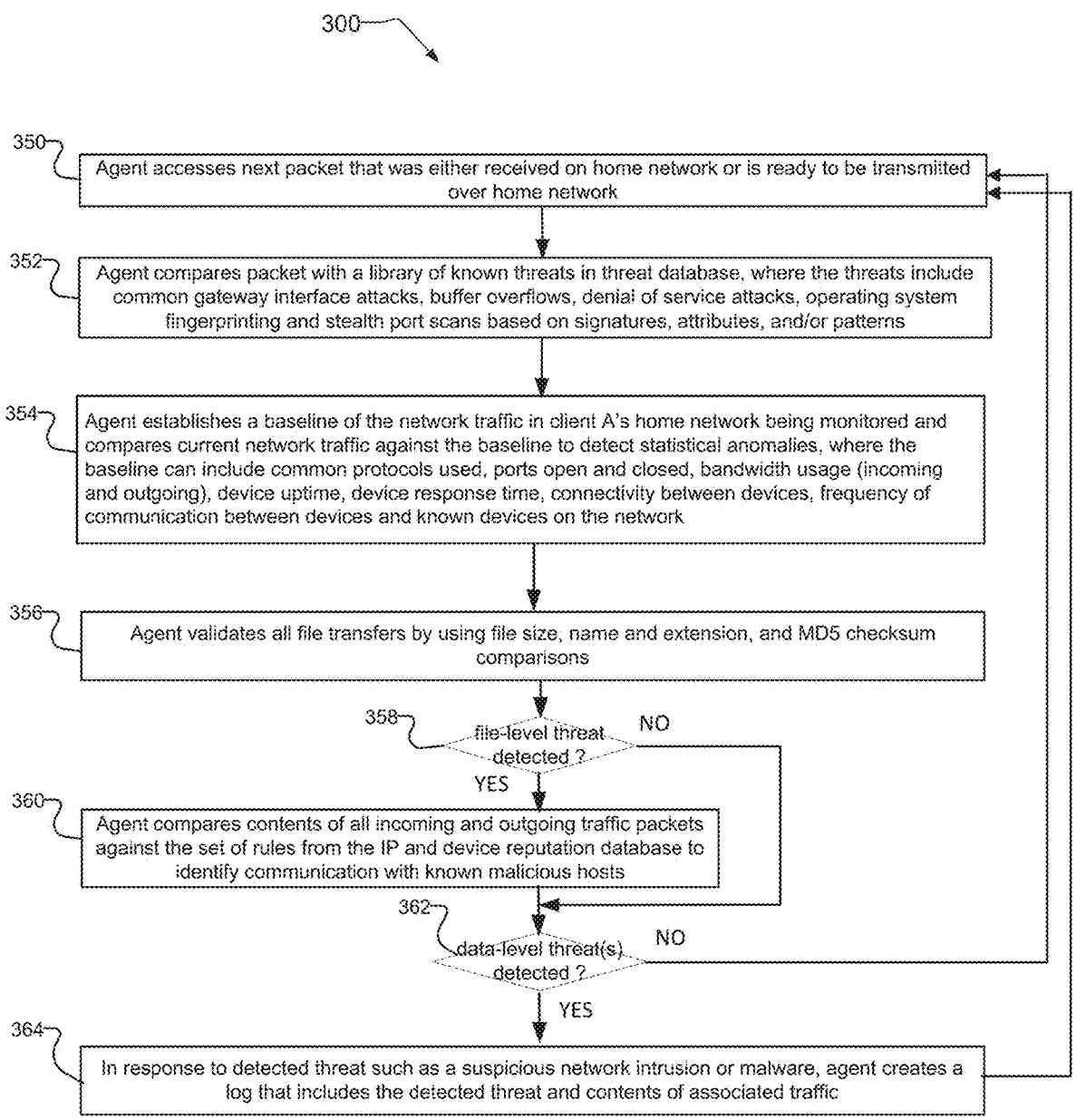
FIG. 9 is a flow diagram that shows detail common to all embodiments for how the agent analyzes data traffic on the device that hosts the agent.

FIG. 9 provides more detail for FIG. 2 step 300. Note that the data traffic analysis performed by the agent 50 in step 300 is a continuous process.

In step 350, the agent 50 accesses the next packet that was either received on home network 148-1 or is ready to be transmitted over the home network 148-1. In step 352, the agent 50 compares the packet with a library of known threats in threat database 166, where the threats include common gateway interface attacks, buffer overflows, denial of service attacks, operating system fingerprinting and stealth port scans based on signatures, attributes, and/or patterns, in examples.

According to step 354, the agent 50 then establishes a baseline of the network traffic in client A's home network 148-1 being monitored and compares current network traffic against the baseline to detect statistical anomalies. The baseline can include common protocols used, ports open and closed, bandwidth usage (incoming and outgoing), device uptime, device response time, connectivity between devices, frequency of communication between devices and known devices on the home network 148-1, in examples.

In step 356, the agent 50 validates all file transfers by using file size, name and extension, and MD5 checksum comparisons, in examples. In step 358, the agent 50 determines if a file level threat has been detected. If a threat has not been detected, the method transitions to step 362. Otherwise, the agent 50 in step 360 compares contents of all incoming and outgoing traffic packets against the set of rules from the IP and device reputation database 142 to identify communication with known malicious hosts.

In step 362, the agent 50 determines if a data-level threat has been detected. If a threat has not been detected, the method transitions to step 350 to access and examine the next packet. Otherwise, the agent 50 in step 364 creates a log that includes the detected threat and contents of associated traffic in response to the detected threat. In examples, detected threats can include a suspicious network intrusion or malware. At the conclusion of step 364, method transitions to step 350 to access and examine the next packet.

Returning to FIG. 2, the agent 50 executes a host intrusion and detection scan 400 on the device that hosts the agent 50. In FIG. 2, this is the IDPS device 112.

Figure 10:
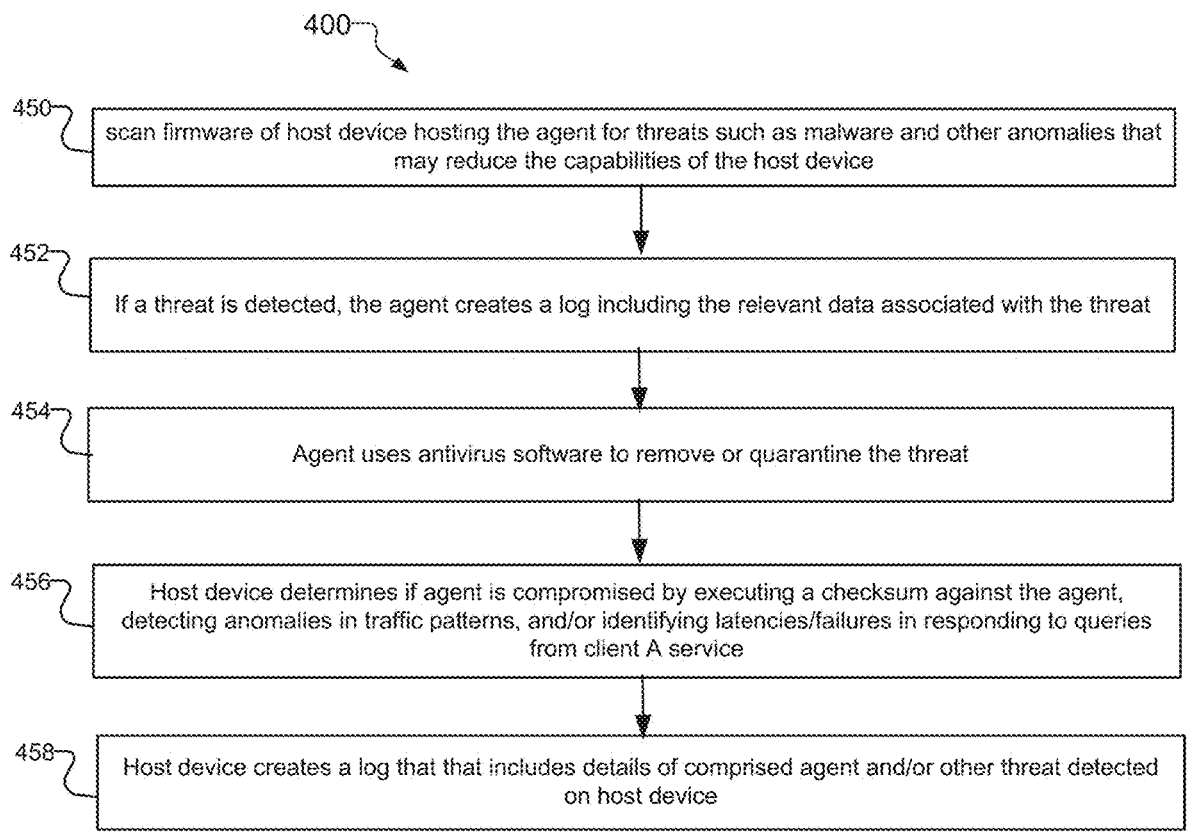
FIG. 10 is a flow diagram that shows detail common to all embodiments for how the agent executes a host intrusion and detection scan of the device that hosts the agent.

FIG. 10 provides more detail for FIG. 2 step 400. Note that the host intrusion and detection scan performed by the agent in step 400 is preferably executed in a synchronous or "on demand" fashion, in response to a request from the client A service 120-1. In other implementations, however, step 400 can be executed in an asynchronous or periodic fashion without a request from the client A service 120-1.

In step 450, the agent 50 scans the firmware of host device hosting the agent for threats such as malware and other anomalies that may reduce the capabilities of the host device. In step 452, if a threat is detected, the agent 50 creates a log that includes the relevant data associated with the threat. In step 454, the agent 50 uses antivirus software to remove a quarantine the threat.

In step 456, the host device determines if the agent 50 is compromised by executing a checksum against the agent 50, detecting anomalies in traffic patterns, and/or identifying latencies/failures in responding to queries from client A service 120-1, in examples. Finally, in step 458, the host device creates a log that includes details of compromised agent 50 and/or other threats detected on the host device.

Returning to FIG. 2, the agent 50 executes home network vulnerability and security configuration scans across the devices in the home network 148-1.

Figure 11:
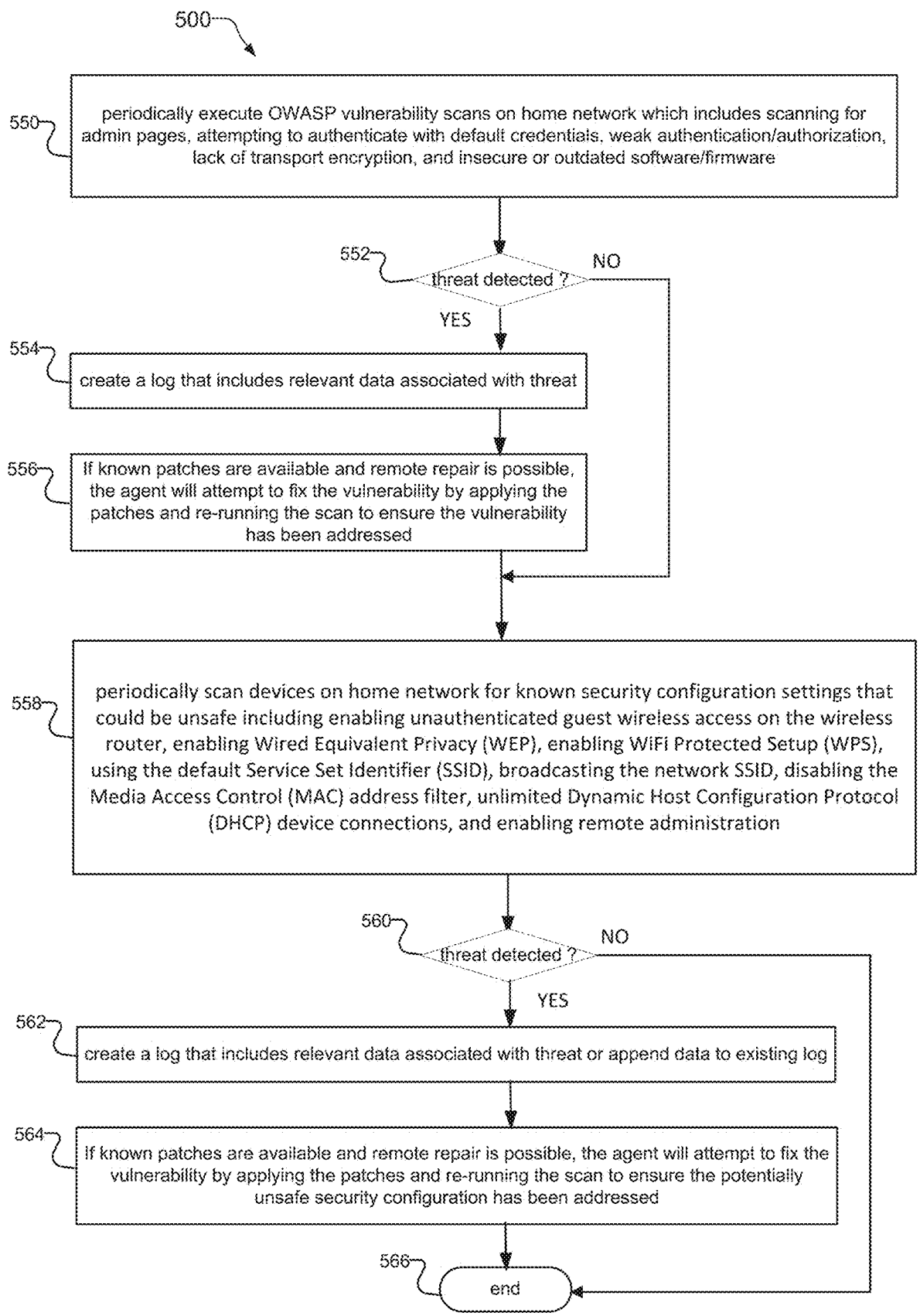
FIG. 11 is a flow diagram that shows detail common to all embodiments for how the device that hosts the agent executes a home network vulnerability and security configuration scan.

FIG. 11 provides more detail for FIG. 2 step 500. Note that the host intrusion and detection scan performed by the agent in step 500 can be executed in a synchronous or "on demand" fashion, in response to a request from the client A service 120-1. In other implementations, step 500 can be executed in an asynchronous or periodic fashion without a request from the client A service 120-1.

In step 550, the agent periodically executes an OWASP (Open Web Application Security Project) vulnerability scan on the home network 1488-1. This includes scanning for admin pages, attempting to authenticate with default credentials, weak authentication/authorization, lack of transport encryption, and insecure or outdated software/firmware, in examples.

In step 552, the agent 50 determines if a threat has been detected associated with the vulnerability scan. If no threat has been detected, the method transitions to step 558. Otherwise, in step 554, the agent 50 creates a log that includes relevant data associated with threat. If known patches are available and remote repair is possible, the agent 50 will attempt to fix the vulnerability by applying the patches and re-running the scan to ensure the vulnerability has been addressed, in step 556.

In step 558, the agent 50 periodically scans devices on the home network 148-1 for known security configuration settings that could be unsafe including enabling unauthenticated guest wireless access on the wireless router, enabling Wired Equivalent Privacy (WEP), enabling WiFi Protected Setup (WPS), using the default Service Set Identifier (SSID), broadcasting the network SSID, disabling the Media Access Control (MAC) address filter, unlimited Dynamic Host Configuration Protocol (DHCP) device connections, and enabling remote administration, in examples.

In step 560, the agent 50 determines if a threat has been detected associated with the security configuration scan. If no threat has been detected, the method transitions to step 566. Otherwise, in step 562, the agent 50 creates a log that includes relevant data associated with threat, or appends data to the existing log file created in step 554. If known patches are available and remote repair is possible, the agent 50 will attempt to fix the vulnerability by applying the patches and re-running the scan to ensure that the potentially unsafe security configuration has been addressed, in step 564. The method ends at step 566.

Returning to FIG. 2, in step 214, the agent 50 sends data traffic, log files, and results from the agent analysis in prior steps 300, 400, and 500 to the client A service 120-1. In step 600, the client A service 120-1 further analyzes the data traffic and log files received from the agent 50.

Figure 12A:
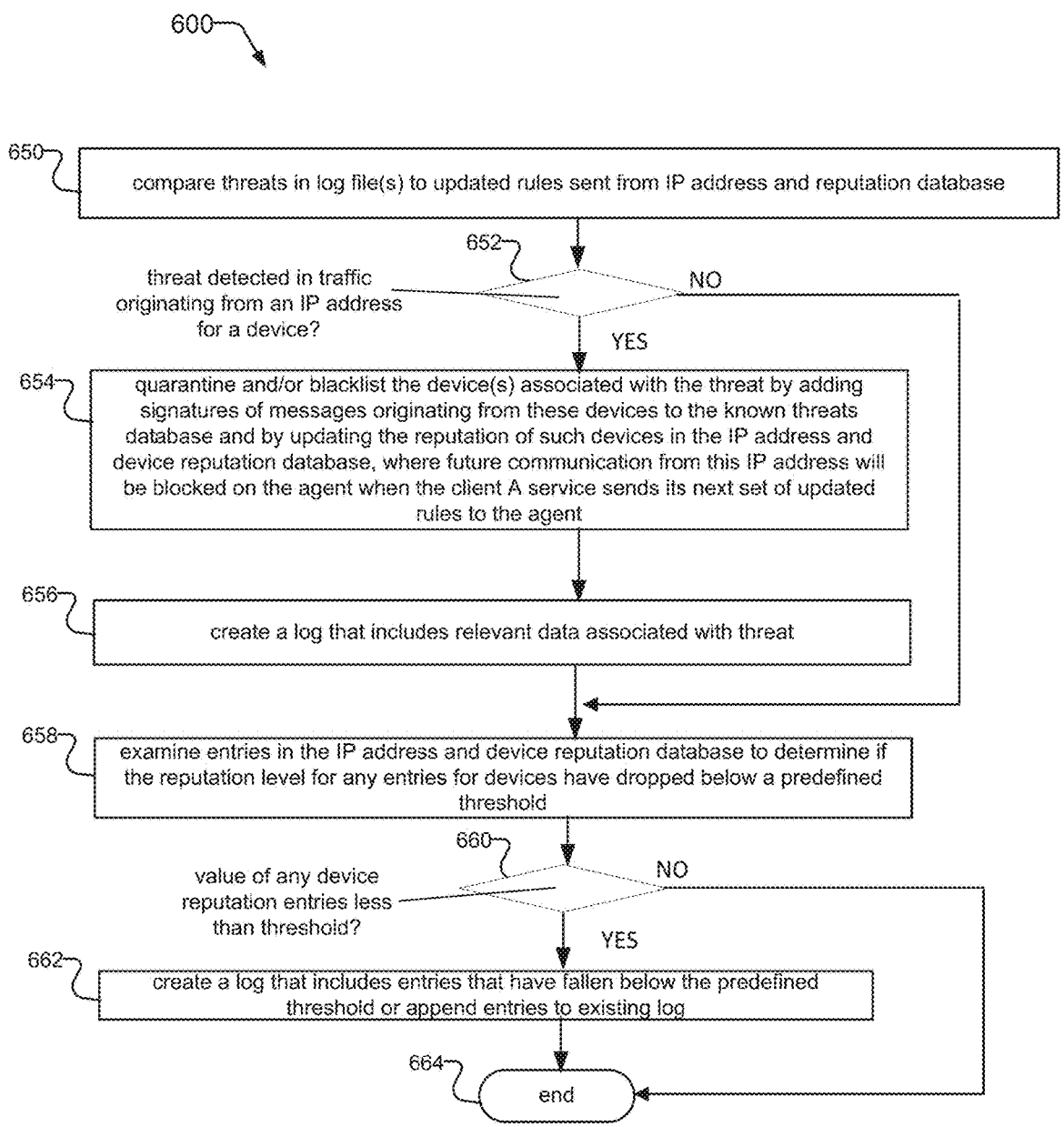
FIGS. 12A and 12B are flow charts that show methods common to all embodiments for how the managed service application for a given client home network executes high-level scans for vulnerabilities across the devices in the client's home network, where FIG. 12A describes a periodic scan for device credentials, and FIG. 12B describes a periodic scan for device configuration settings.

FIG. 12A provides more detail for FIG. 2 step 600.

In step 650, client A service A 120-1 compares the threats in log file(s) to updated rules sent from the IP address and reputation database 142. In step 652, the client A service 120-1 determines if a threat has been detected in traffic originating from an IP address for a device. If no threat has been detected, the method transitions to step 658. Otherwise, in step 654, the client A service 120-1 quarantines and/or blacklist the device(s) associated with the threat by adding signatures of messages originating from these devices to the known threats database 166 and by updating the reputation of such devices in the IP address and device reputation database, where future communication from this IP address will be blocked on the agent 50 when the client A service 120-1 sends its next set of updated rules to the agent 50. In step 656, the client A service 120-1 create a log that includes relevant data associated with the threat.

According to step 658, the client A service 120-1 examines entries in the IP address and device reputation database to determine if the reputation level for any entries for devices have dropped below a predefined threshold. In step 660, the client A service 120-1 determines if the value of any device reputation entries is less than the threshold. If the condition is not met, the method transitions to step 664. Otherwise, the client A service 120-1 create a log that includes entries that have fallen below the predefined threshold or append entries to the existing log created in step 656.

Returning to FIG. 2, in step 216, the client A service 120-1 sends data traffic and results from both the agent analysis and the client A service 120-1 analysis to the analytics system 138. In step 700, the analytics system 38 analyzes the received data traffic and results sent from the client A service 120-1. Note that this can be an aggregate of the data traffic and results from steps 214 and 600.

Figure 12B:
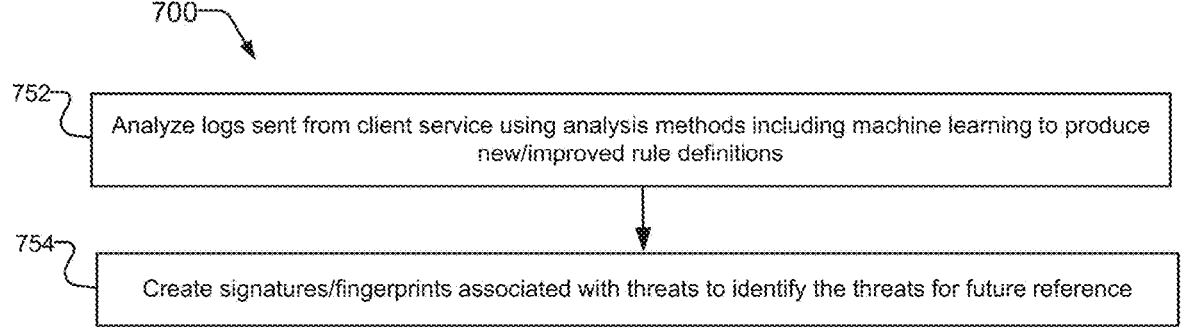

FIG. 12B provides more detail for FIG. 2 step 700.

In step 752, the analytics system 138 analyzes the log sent from client service A 120-1 using analysis methods including machine learning to produce new/improved rule definitions. In step 754, the analytics system 138 then creates signatures/fingerprints associated with threats to identify the threats for future reference.

Returning to FIG. 2, in step 218, the analytics system 138 sends a rules update to the client A service 120-1. In step 220, the agent 50 sends patches and/or updates to the devices on the network such as the wired door sensor 172 and the wireless motion sensor 166-1. In step 222, the agent 50 sends notification messages to the client A service 120-1 that includes information associated with detected threats are other issues. In response in step 224, the client A service 120-1 notifies the registered users for the client A home network 148-1 of any detected issues.

Figure 3:
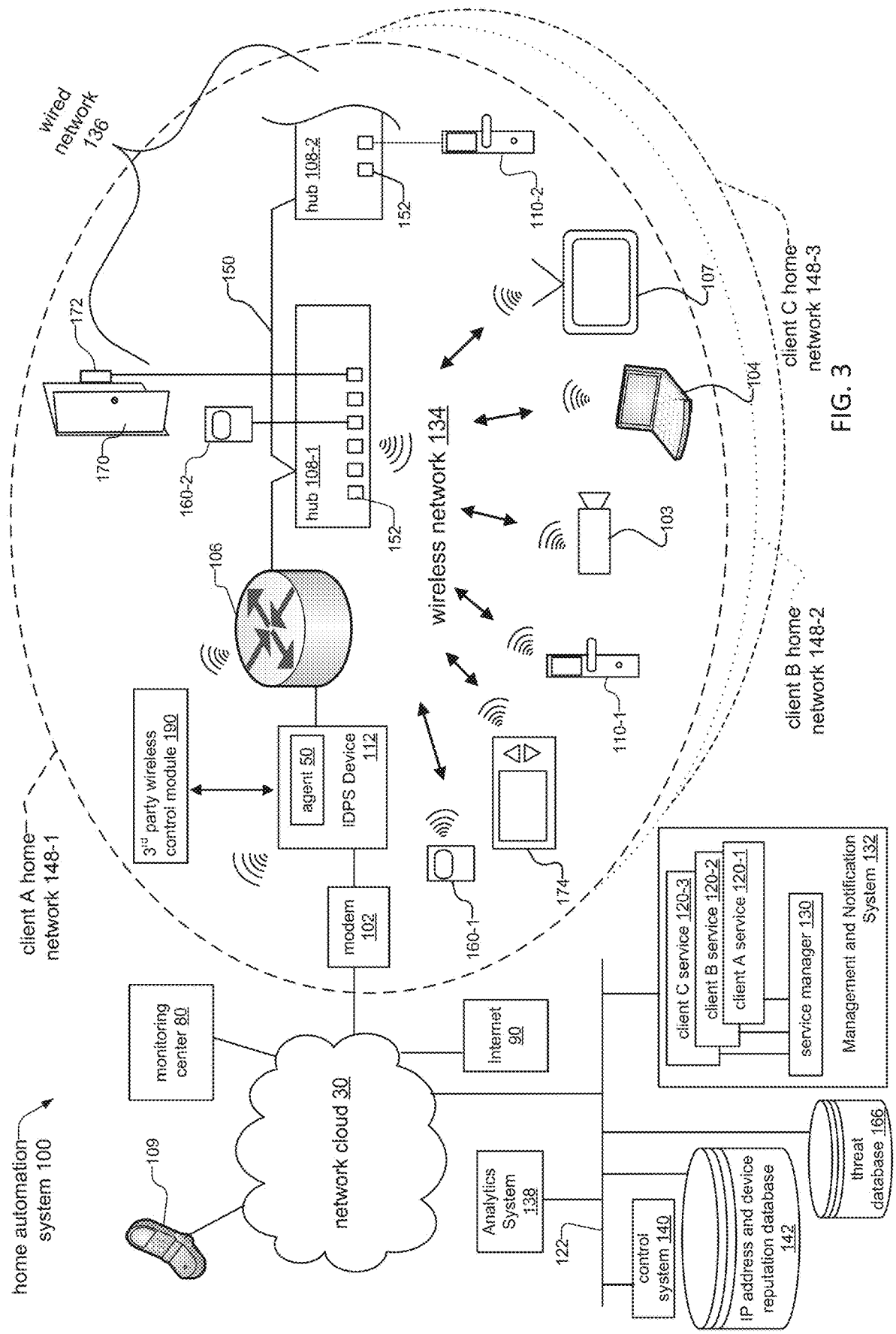
FIG. 3 is a schematic block diagram of a second embodiment of the Home Network IDPS system, where the IDPS device hosting the agent is added to a home network that already includes a router and/or hub.

FIG. 3 shows a second embodiment of the Home Network IDPS system 100. In contrast to the embodiment of FIG. 1, the home network 148-1 includes a router 106 and one or more hubs 108-1 and 108-2. The hubs 108 include ports 152 to which smart devices in the network connect. The home networks 148 include an IDPS device 112 that is inserted between the modem/internet access point 102 and the router 106.

Figure 4:
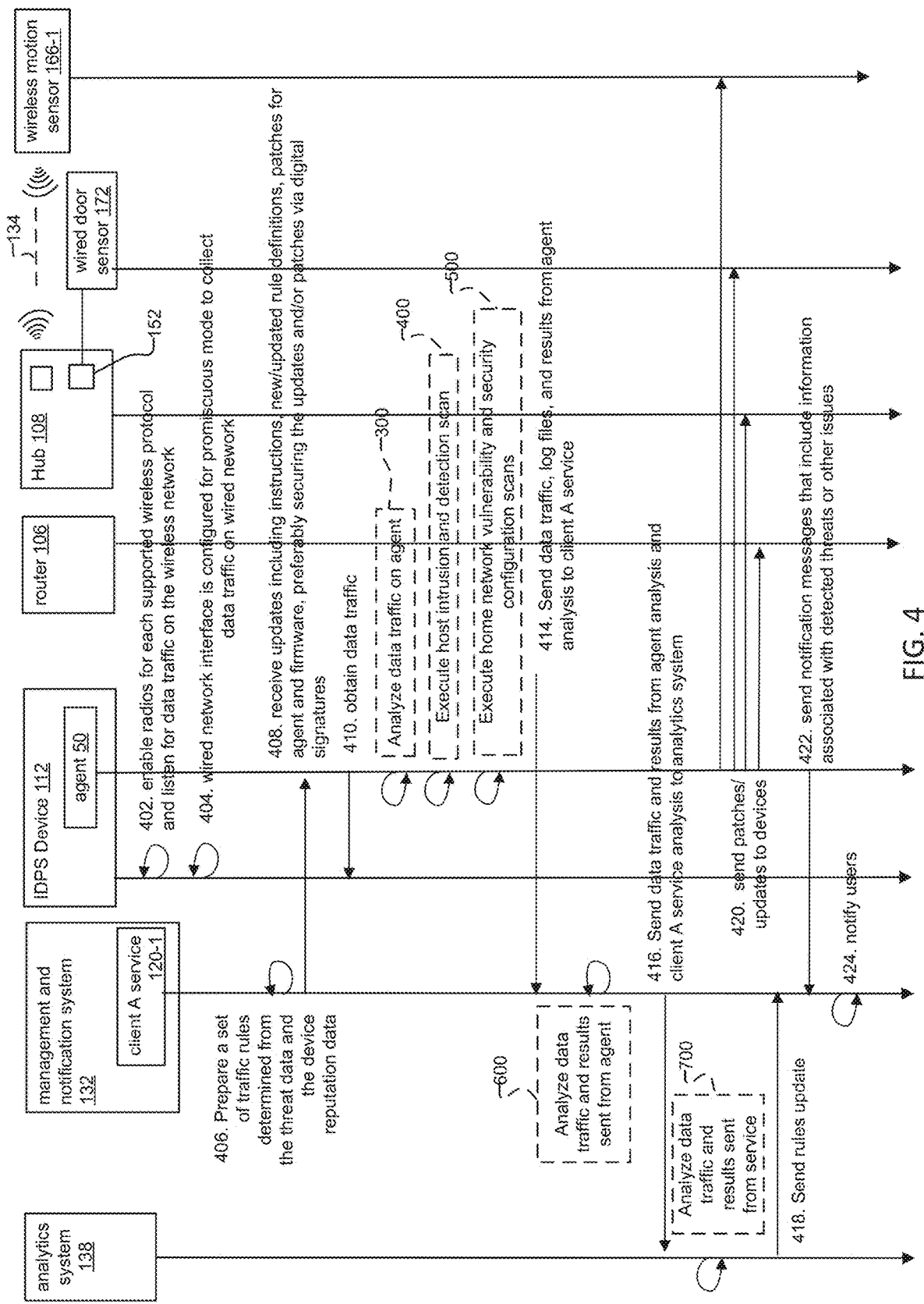
FIG. 4 is a flow diagram showing data flows between the major components of the embodiment of FIG. 3 for exemplary client A's home network.

FIG. 4 shows data flows between high-level components in the embodiment of FIG. 3. The data flows and interactions are similar to that of FIG. 2. In addition to the components shown in the flow chart of FIG. 2, FIG. 4 also includes the router 106 and the hub 108 as devices.

Steps 402, 404, 406, 408, 410, 414, 416, 418, 420, 422, and 424 of FIG. 4 are analogous to steps 202, 204, 206, 208, 210, 214, 216, 218, 220, 222, and 224 of FIG. 2. The only material difference is that the actions associated with the devices such as the vulnerability scans and updates sent to devices now include the router 106 and hubs 108 as target devices.

Figure 5:
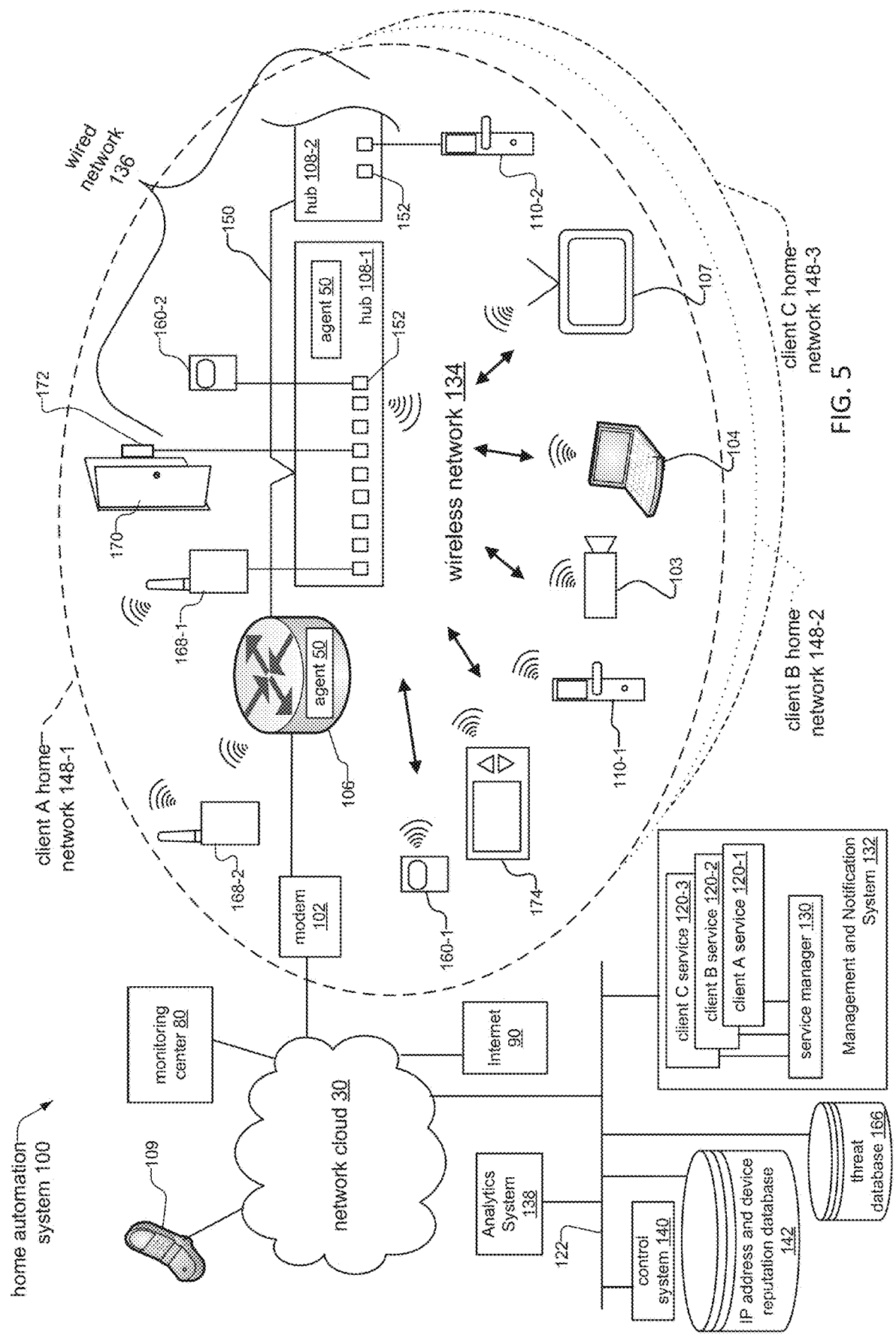
FIG. 5 is a schematic block diagram of a third embodiment of the Home Network IDPS system, where the agent is hosted on a router within the home network, and where the home network includes IDPS sensors that each support a wireless protocol not already supported by the router.

FIG. 5 shows a third embodiment of the Home Network IDPS system 100. Like the embodiment of FIG. 3, the home network 148-1 includes a router 106 and one or more hubs 108-1 and 108-2. Unlike FIG. 3, however, there is no IDPS device 112 added to the home network 148-1. Instead, individual IDPS sensors 168 are included within the home network that each support a different wireless protocol. The IDPS sensors 168 can be either wired 168-1 or wireless 168-2. The IDPS sensors 168 provide support for wireless protocols not already supported on the router 106 and/or hub 108.

Also in contrast to the embodiment of FIG. 3, the router 116 hosts the agent 50. In other examples, however, the agent 50 can be hosted on the hubs 108, and separate instances of the agent 50 can be hosted on both the router 106 and hubs 108.

Figure 6:
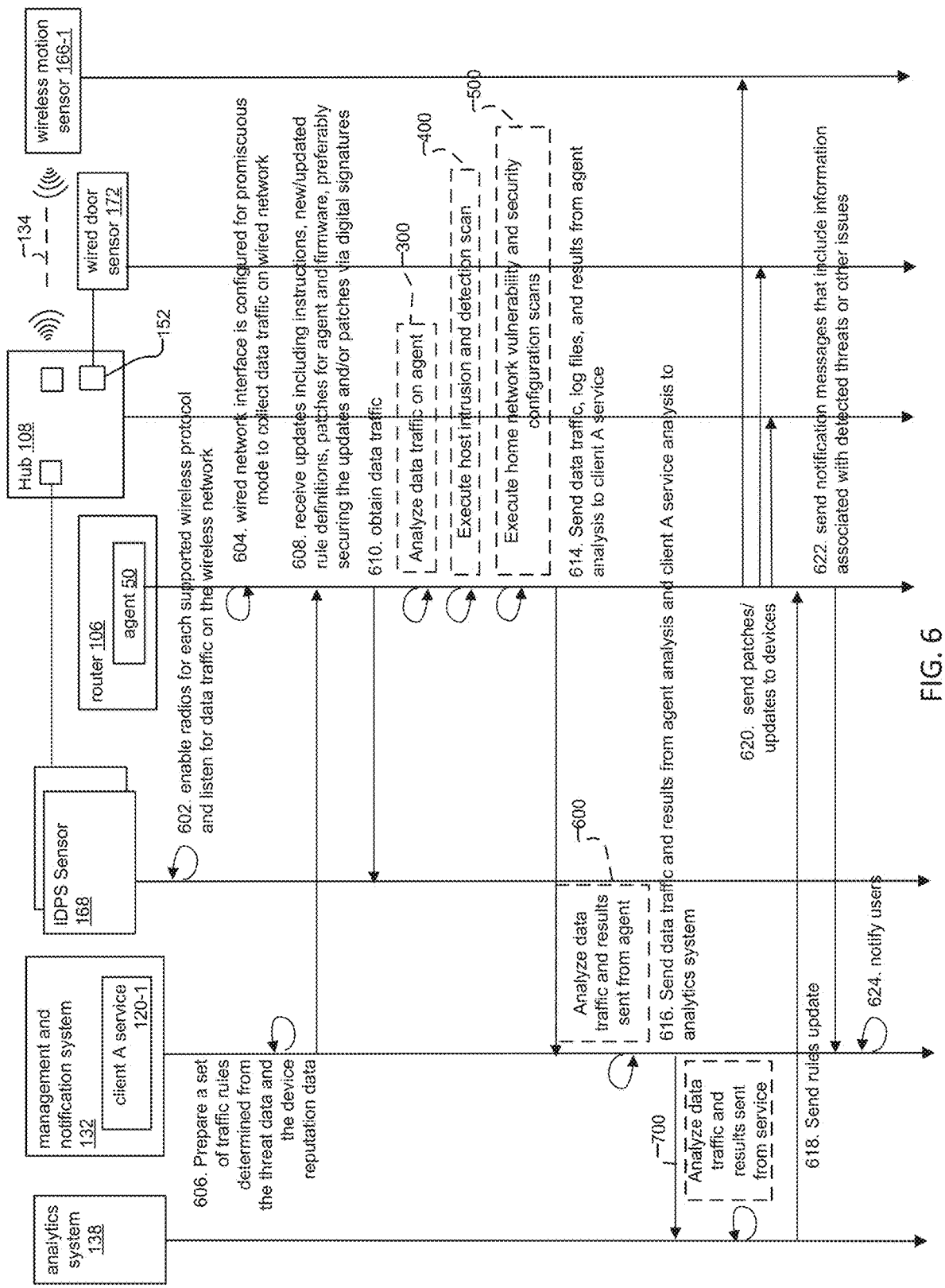
FIG. 6 is a flow diagram showing data flows between the major components of the embodiment of FIG. 5 for exemplary client A's home network.

FIG. 6 shows data flows between high-level components in the embodiment of FIG. 5. The data flows and interactions are similar to that of FIG. 4. FIG. 6 includes the same high-level components as shown in the flow chart of FIG. 4, with the exception that the IPDS device 112 of FIG. 4 is replaced with one or more IPDS sensors 168, and the agent 50 in FIG. 6 is included within/hosted b the router 106.

Steps 604, 606, 608, 610, 614, 618, 620, 622, and 624 of FIG. 6 are analogous to steps 204, 206, 208, 210, 214, 216, 218, 220, 222, and 224 of FIG. 2.

Step 602 of FIG. 6 also enables wireless radios for supporting different wireless protocols, as does step 202 of FIG. 2. However, each of the IDPS sensors 168 in FIG. 6 includes a radio associated with support for a different wireless protocol.

Otherwise, the only other material difference in FIG. 6 as compared to FIG. 4 is that the interactions between the agent 50 and the other components now reflect the fact that the agent 50 is hosted on the router 106.

Figure 7:
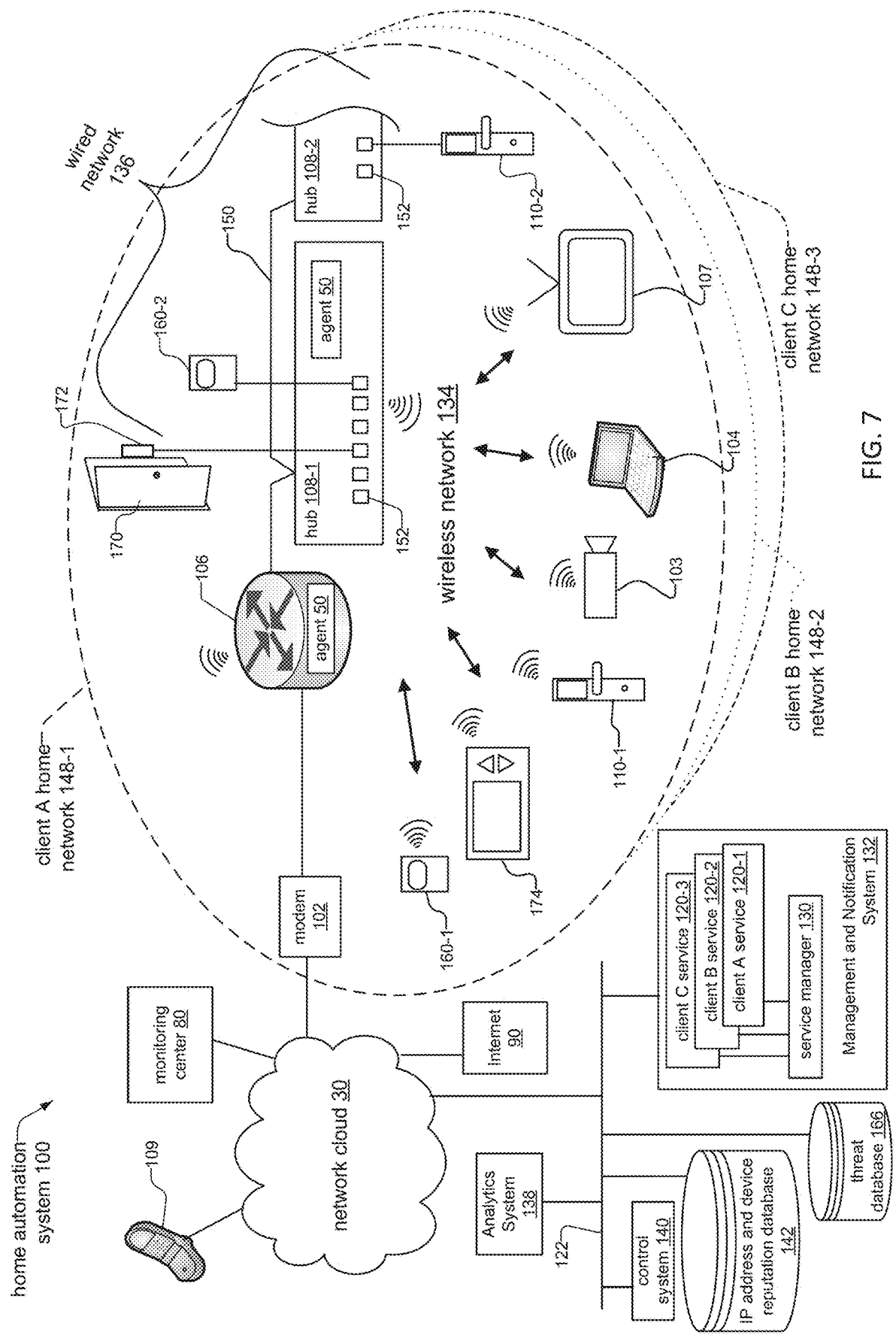
FIG. 7 is a schematic block diagram of a fourth embodiment of the Home Network IDPS system, where the agent is hosted on a router within the home network.

FIG. 7 shows a fourth embodiment of the Home Network IDPS system 100. Like the embodiment of FIG. 5, the home network 148-1 includes a router 106 and one or more hubs 108-1 and 108-2, and the router 116 hosts the agent 50. Unlike FIG. 5, however, there are no IDPS sensors 112 added to the home network 148-1. Specifically, this embodiment provides a software-only intrusion detection and prevention solution for home networks 148, via the agent 50 installed/hosted within the router 106 and/or hub 108.

Figure 8:
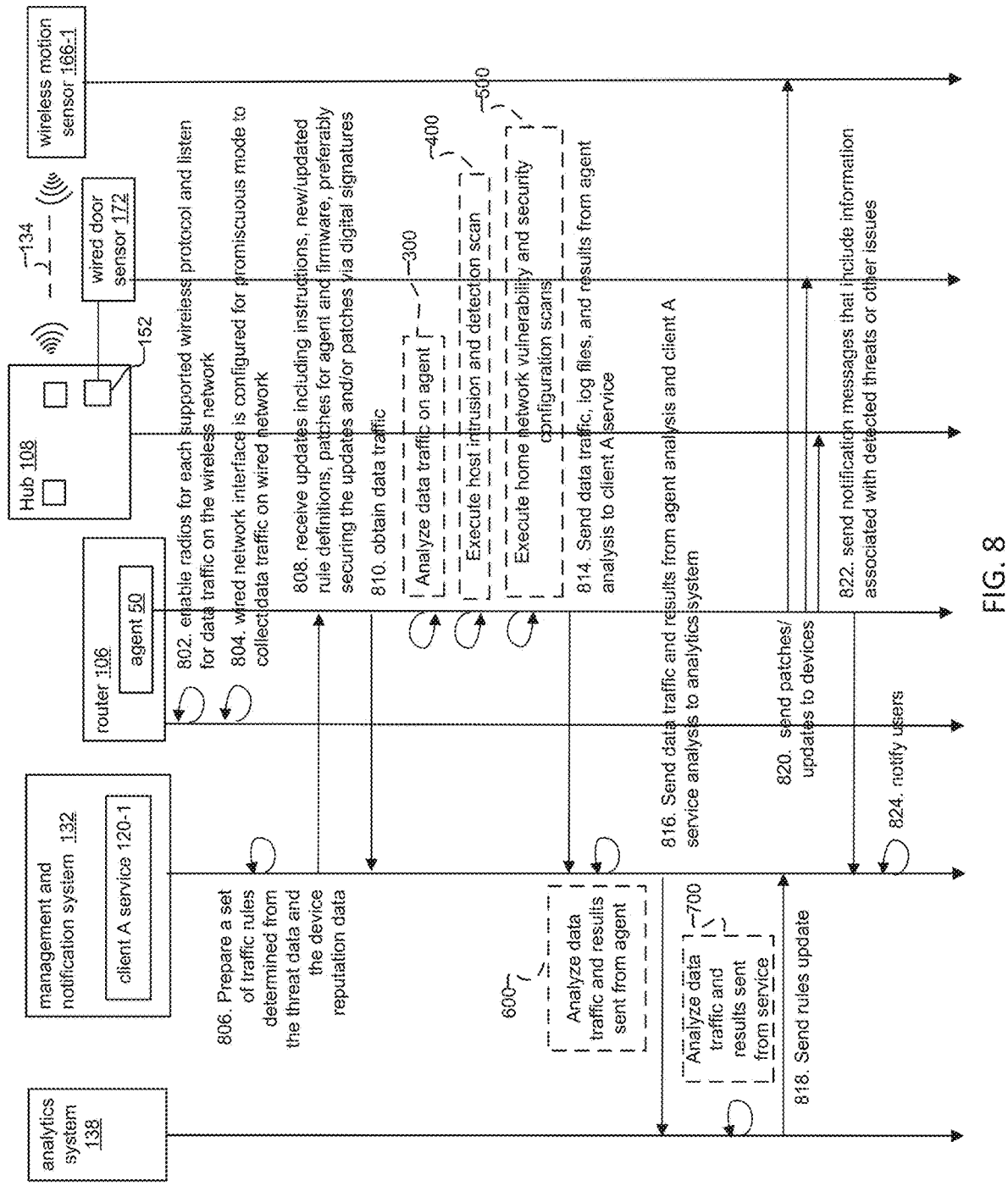
FIG. 8 is a flow diagram showing data flows between the major components of the embodiment of FIG. 7 for exemplary client A's home network.

FIG. 8 shows data flows between high-level components in the embodiment of FIG. 7. The data flows and interactions are similar to that of FIG. 6. FIG. 8 includes the same high-level components as shown in the flow chart of FIG. 6, with the exception that the IPDS sensors 168 are not included.

Steps 804, 806, 808, 810, 814, 816, 818, 820, 822, and 824 of FIG. 8 are analogous to steps 204, 206, 208, 210, 214, 216, 218, 220, 222, and 224 of FIG. 2.

Step 802 of FIG. 8 also enables wireless radios for supporting different wireless protocols, as does step 202 of FIG. 2. However, only the wireless radios supported on the router 106 are enabled.

Figure 13:
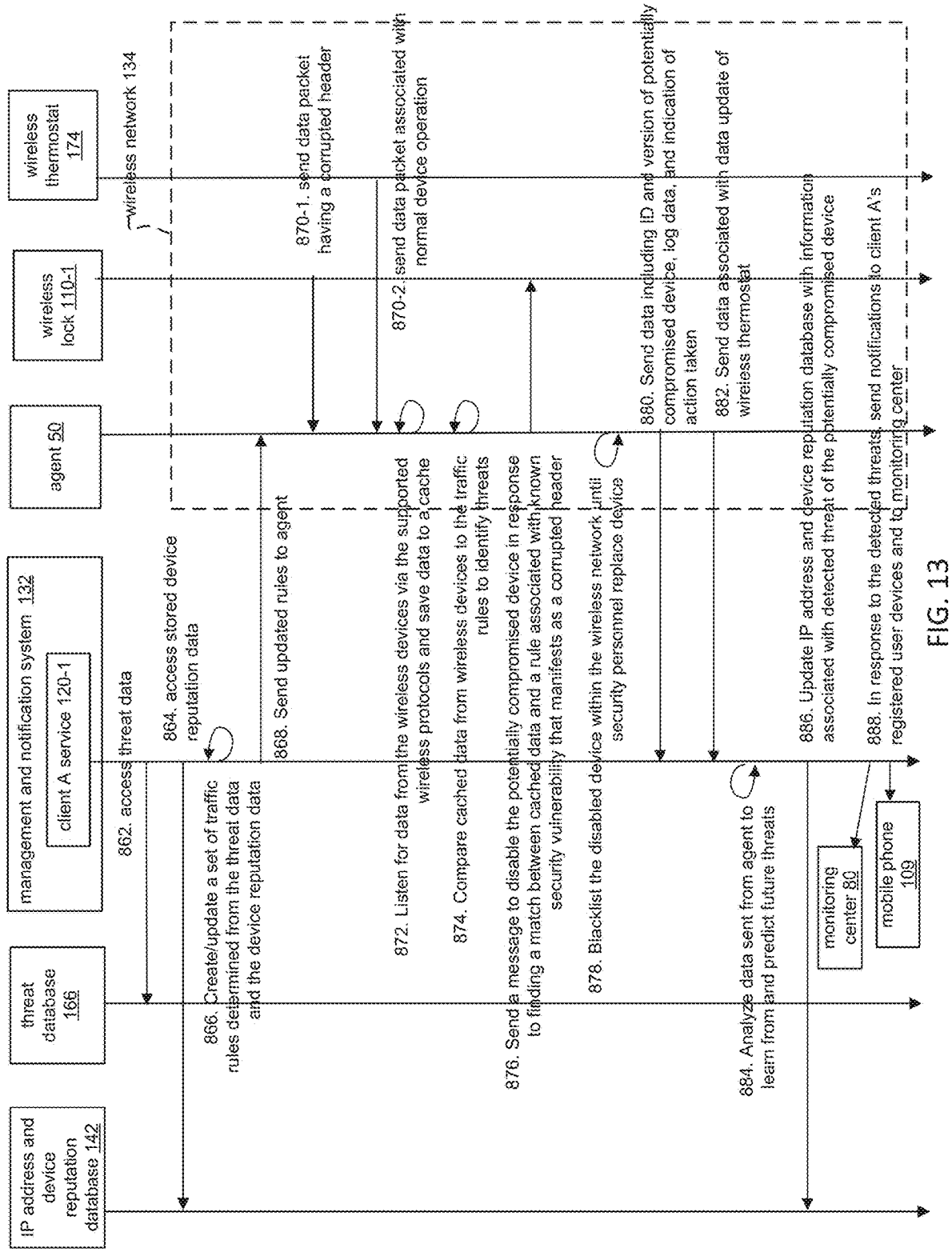
FIG. 13 is a flow chart that shows a method common to all embodiments for how the agent in conjunction with the managed service application for client A's home network detects and responds to a specific threat.

FIG. 13 shows data flows between high-level components common to all embodiments, in response to a specific threat introduced into a wireless lock device 110-1 that communicates over the wireless network 134 of the client A home network 148-1. The common behavior/data flows is accomplished by focusing on the interactions between the agent 50 and the other components, independent of the host device that includes the agent 50.

The components included within FIG. 13 include the IP address and device reputation database 142, the threat database 166, the management notification system 132 and its client A service 120, the agent 50, and exemplary wireless devices such as wireless lock 110-1 and wireless thermostat 174 that communicate over the wireless network 134 of client A home network 148-1.

In step 862, the client A service 120-1 accesses data from the threat database 166. In step 864, the client A service 120-1 accesses stored device reputation data from the IP address and device reputation database 142. According to step 866, the client A service 120-1 then creates or updates a set of traffic rules determined from the threat data and the device reputation data. In step 868, the client A service 120-1 send the updated rules to the agent 50.

In step 870-1, the wireless lock 110-1 sends a data packet that includes a corrupted header. In one example, the corruption could have occurred because of a bug in the firmware in the device. In another example, the corruption could be the result of a malicious attack against the wireless network 134 of client home network 148-1. Though the corruption may have occurred in a device other than the wireless lock 110-1, traffic from one smart device associated with one port 152 on the hub 108 is repeated by the hub to all other ports 152 to which the other wireless devices connect. As a result, the wireless lock 110-1, the wireless thermostat 174, and all other devices on the wireless network 134 could now be compromised.

In step 870-2, the wireless thermostat 174 sends a data packet associated with normal device operation, such as a periodic message indicating the current power level of the battery of the wireless thermostat 174.

In step 872, the agent 50 listens for data from the wireless devices 110-1/174 via the supported wireless protocols of the home network 148-1 and saves the data to a cache. In step 874 the agent 50 compares the cached data from the wireless devices 110-1/174 to the traffic rules to identify threats. In step 876, the agent 50 sends a message to disable the potentially compromised device (e.g. the wireless lock 110-1) in response to finding a match between the cached data and a rule associated with known security vulnerability that manifests as a corrupted header.

According to step 878, the agent 50 then blacklists the disabled device within the wireless network 134 until security personnel replace can replace the device. In step 880, the agent 50 sends data including an ID and version number of the potentially compromised wireless lock device 110-1, log data, and indication of action taken by the agent 50. In step 882, the agent sends data associated with the data update of the wireless thermostat 174.

In step 884, the client A service 120-1 analyzes data sent from agent 50 to learn from and predict future threats. The data sent from the agent 50 includes data updates and messages sent from other devices on the wireless network 134 such as the wireless thermostat 174. The client A service 120-1 updates the IP address and device reputation database 142 with information associated with the detected threat of the potentially compromised device (e.g. the wireless lock 110-1) in step 886.

In step 888, in response to the detected threats, the client A service 110-1 sends notifications over the network cloud 30 to client A's registered user devices such as mobile phones 109 and to a monitoring center 80.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network intrusion detection and prevention system, comprising: a services network having a management and notification system that executes client services; home intrusion and detection devices for client homes, each of these devices communicating via wired and wireless ports for home wired networks and home wireless networks and reporting to a corresponding one of the client services, the home intrusion and detection devices configured to monitor data traffic across the home wired networks and the home wireless networks and log threats relative to a library of known threats; prepare a set of traffic rules for the home wired networks and the home wireless networks based on the logged threats and the library of known threats; update the set of traffic rules based on the logged threats and the library of known threats to include threats logged since the set of traffic rules was prepared; and disable compromised wireless door locks installed at the client homes in response to an identification in the data traffic of a violation of the set of traffic rules indicating a threat relative to the library of known threats.

2. A system as claimed in claim 1, wherein the services network further comprises an analytics system, an IP address and device reputation database, and a threat database.

3. A system as claimed in claim 1, wherein the management and notification system includes separate managed client services for each home intrusion and detection device.

4. A system as claimed in claim 1, wherein the home intrusion and detection devices enable radios for each supported wireless networks and listen for data traffic on the wireless networks and analyze the data traffic against rules supplied by the services network.

5. A system as claimed in claim 1, wherein the home intrusion and detection devices scan their firmware for malware and/or other anomalies.

6. A system as claimed in claim 1, wherein home intrusion and detection devices scan devices on the networks for security configuration settings that could be unsafe.

7. A system as claimed in claim 1, wherein the home intrusion and detection devices include ports connected with wireless motion detectors, wireless door locks and wireless video cameras of the client homes.

8. A system as claimed in claim 1, wherein the home intrusion and detection devices include ports connected with wired door sensors for doors and wired motion sensors of the client homes.

9. A system as claimed in claim 1, wherein the home intrusion and detection devices communicate with one or more third-party wireless control modules including proprietary home automation controllers.

10. A system as claimed in claim 1, wherein the home intrusion and detection devices each execute a software agent that detects threats, blocks threats, conducts penetration testing, scans for security vulnerabilities, logs detected threats, samples traffic or anomalies, delivers logged data to a managed service application over a network cloud for advanced analysis, and receives periodic updates and on-demand instructions to resolve issues detected.

11. A system as claimed in claim 1, wherein the home intrusion and detection devices access packets that are received on the home networks compare the packets to a library of known threats in a threat database, where the threats include common gateway interface attacks, buffer overflows, denial of service attacks, operating system fingerprinting and stealth port scans.

12. A system as claimed in claim 1, wherein the home intrusion and detection devices establish baseline of the network traffic on the home networks and compare current network traffic against the baseline to detect statistical anomalies, the baseline including common protocols used, ports open and closed, bandwidth usage (incoming and outgoing), device uptime, device response time, connectivity between devices, frequency of communication between devices and known devices on the home networks.

13. A system as claimed in claim 1, wherein the home intrusion and detection devices listen for data from the wireless locks of the home networks and save the data to a cache and compare the cached data to the traffic rules to identify threats and disable potentially compromised wireless locks in response to finding a match between the cached data and a rule associated with known security vulnerability and then blacklist the disabled wireless locks within the wireless network until replaced.

14. A network intrusion detection and prevention method, comprising:
  providing a services network having a management and notification system that executes client services;
  communicating, by home intrusion and detection devices for client homes, via wired and wireless ports to home wired networks and home wireless networks and reporting to a corresponding one of the client services, the home intrusion and detection devices configured to monitor data traffic across the home wired networks and the home wireless networks and log threats relative to a library of known threats;
  preparing, based on the logged threats and the library of known threats, a set of traffic rules for the home wired networks and the home wireless networks;
  updating, based on the logged threats and the library of known threats, the set of traffic rules to include threats logged since the set of traffic rules was prepared; and
  disabling compromised wireless door locks installed at the client homes in response to an identification in the data traffic of a violation of the set of traffic rules indicating a threat relative to the library of know threats.

15. A method as claimed in claim 14, wherein the services network further comprise an analytics system, an EP address and device reputation database, and a threat database.

16. A method as claimed in claim 14, wherein the management and notification system includes separate managed client services for each home intrusion and detection device.

17. A method as claimed in claim 14, wherein the home intrusion and detection devices enable radios for each supported wireless networks and listen for data traffic on the wireless networks and analyze the data traffic against rules supplied by the services network.

18. A method as claimed in claim 14, wherein the home intrusion and detection devices scan their firmware for malware and/or other anomalies.

19. A method as claimed in claim 14, wherein home intrusion and detection devices scan devices on the networks for security configuration settings that could be unsafe.

* * * * *